(12) United States Patent
Bonander

(10) Patent No.: US 11,772,635 B2
(45) Date of Patent: Oct. 3, 2023

(54) AUTOMATED PARKING ASSIST SYSTEM FOR PARKING A VEHICLE IN A PARKING SPOT

(71) Applicant: Volvo Car Corporation, Gothenburg (SE)

(72) Inventor: Martin Bonander, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 75 days.

(21) Appl. No.: 17/174,589

(22) Filed: Feb. 12, 2021

(65) Prior Publication Data

US 2021/0253091 A1    Aug. 19, 2021

(30) Foreign Application Priority Data

Feb. 13, 2020   (EP) .................................... 20157268

(51) Int. Cl.
  *B60W 30/06*   (2006.01)
  *B60W 60/00*   (2020.01)
  *B60W 30/18*   (2012.01)

(52) U.S. Cl.
  CPC ...... *B60W 30/06* (2013.01); *B60W 30/18036* (2013.01); *B60W 60/001* (2020.02); *B60W 60/0051* (2020.02)

(58) Field of Classification Search
  CPC ......... G05D 1/0088; G05D 2201/0213; G05D 1/0246; G05D 1/0212; G05D 1/024; G05D 1/0242; G05D 1/021; G05D 1/0231; G05D 1/0061; G05D 1/0223; G05D 1/0257; G05D 1/0022; G05D 1/0234; G05D 1/0272; G05D 1/0259; G05D 1/0248; G05D 1/0238; G05D 1/02; G05D 1/0055; G05D 1/0044; G05D 1/0027; G05D 1/0016; G05D 1/0011; G05D 1/00; G05D 2201/0212; G05D 1/028; G05D 1/0255; G05D 1/0225; G05D 1/0038;
  (Continued)

(56) References Cited

U.S. PATENT DOCUMENTS

2009/0085771 A1   4/2009   Wu et al.
2015/0025732 A1*  1/2015   Min .................... B62D 15/0285
                                                        701/23
(Continued)

FOREIGN PATENT DOCUMENTS

CN   101306683 A    11/2008
DE   102008017030 A1   10/2009
(Continued)

OTHER PUBLICATIONS

European Search Report dated Jul. 13, 2020 for European Application No. 20157298.2, (Volvo Car Corporation) 9 pages.

*Primary Examiner* — B M M Hannan
*Assistant Examiner* — Erick T. Detweiler
(74) *Attorney, Agent, or Firm* — Amin, Turocy & Watson, LLP

(57) ABSTRACT

The disclosure relates to an automated parking assist system for parking a vehicle in a parking spot, comprising a controller configured to handover drive control from a user to the automated parking assist system; and to start an automated parking procedure; wherein the controller is configured to initiate the handover as the vehicle approaches the parking spot, and to finish the handover before the vehicle reaches the parking spot.

20 Claims, 8 Drawing Sheets

Figure 1:
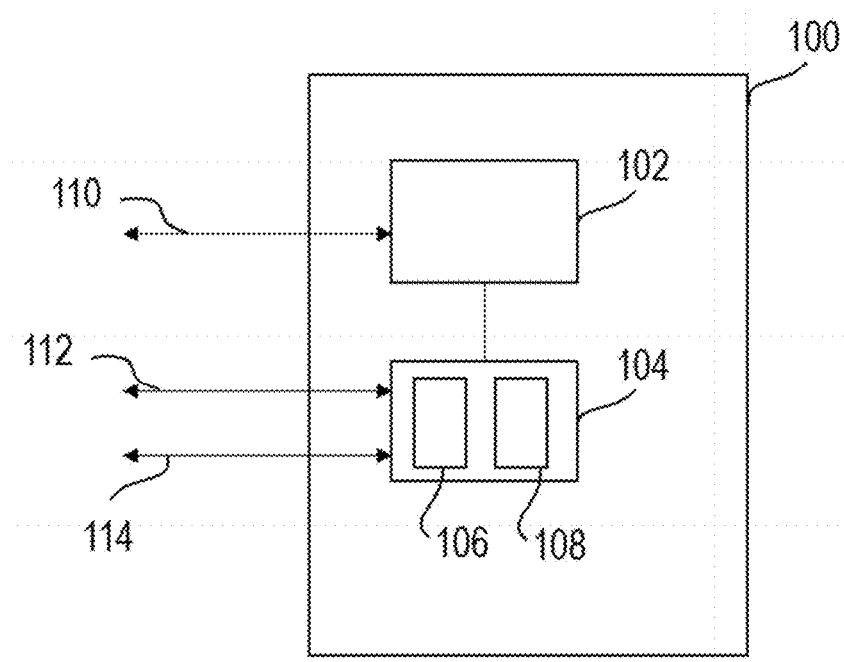

(58) Field of Classification Search
CPC .... B62D 15/0285; B62D 15/025; B62D 1/28; B62D 1/286; B62D 15/0255; B62D 15/0265; B62D 15/0275; B62D 15/027; B62D 1/00; B60W 30/00; B60W 30/06; B60W 10/20; B60W 2710/186; B60W 10/18; B60W 50/082; B60W 50/14; B60W 2050/146; B60W 30/12; B60W 10/04; B60W 2554/80; B60W 30/09; B60W 10/184; B60W 2554/00; B60W 2420/42; B60W 30/143; B60W 30/0956; B60W 2420/40; B60W 2555/60; B60W 2556/50; B60W 2050/143; B60W 2420/52; B60W 2554/40; B60W 2554/4029; B60W 2554/4041; B60W 2554/801; B60W 2554/804; B60W 30/18163; B60W 2040/0809; B60W 2050/0075; B60W 2540/215; B60W 40/08; B60W 40/09; B60W 50/0205; B60W 50/085; B60W 2050/0297; B60W 2420/54; B60W 2520/10; B60W 2552/00; B60W 2556/45; B60W 2556/65; B60W 30/182; B60W 50/023; B60W 50/029; B60W 50/045; B60W 10/30; B60W 2050/0295; B60W 2420/403; B60W 2520/105; B60W 2552/05; B60W 2555/20; B60W 2556/55; B60W 2710/18; B60W 2710/20; B60W 2710/207; B60W 2720/10; B60W 2756/10; B60W 30/18; B60W 30/18027; B60W 40/06; B60W 40/10; B60W 50/12; B60W 60/001; B60W 60/0025; B60W 2040/0872; B60W 2050/0006; B60W 2050/0018; B60W 2050/0074; B60W 2050/021; B60W 2050/0215; B60W 2420/00; B60W 2520/14; B60W 2520/16; B60W 2520/28; B60W 2540/21; B60W 2540/22; B60W 2556/00; B60W 2556/10; B60W 2710/0677; B60W 2710/1005; B60W 2710/1044; B60W 60/0051; B60W 30/18036; G08G 1/168; G08G 1/143; G08G 1/146; G08G 1/14

See application file for complete search history.

(56) References Cited

U.S. PATENT DOCUMENTS

| | | |
|---|---|---|
| 2016/0375897 A1 | 12/2016 | Shimizu et al. |
| 2018/0345955 A1* | 12/2018 | Kim ........................ B60R 1/00 |
| 2019/0054927 A1* | 2/2019 | Hayakawa ............ B60W 30/06 |
| 2019/0111971 A1 | 4/2019 | Stefan |
| 2019/0161092 A1* | 5/2019 | Kim .................... B60W 50/087 |
| 2021/0041870 A1* | 2/2021 | Dyer ........................ B62D 6/00 |

FOREIGN PATENT DOCUMENTS

| | | |
|---|---|---|
| DE | 102009046677 A1 | 5/2011 |
| DE | 102018209866 A1 | 12/2019 |
| EP | 2557020 A2 | 2/2013 |
| WO | 2009000373 A1 | 12/2008 |

* cited by examiner

AUTOMATED PARKING ASSIST SYSTEM FOR PARKING A VEHICLE IN A PARKING SPOT

CROSS-REFERENCE TO RELATED APPLICATIONS

This application claims priority to European Application No. EP20157268.2 filed Feb. 13, 2020.

TECHNICAL FIELD

The present disclosure relates to an automated parking assist system, a vehicle comprising an automated parking assist system, a controller, a method for parking a vehicle in a parking spot, a program element, and a computer readable medium.

BACKGROUND ART

Automated parking assist systems support a driver of a vehicle to guide a vehicle optimally into a parking spot. When detecting a parking spot, the dimensions of the spot are estimated usually when reaching the parking spot. In a next step, the drive control of the vehicle is passed from the driver to the automated parking assist system. The trajectory from the current to the final position is calculated when handing over the vehicle to the controller. This might result in several parking maneuvers until the vehicle has reached its final parking position.

SUMMARY

It may be seen as an objective of the disclosure to reduce the number of automated maneuvers when driving a vehicle into a parking spot, thereby saving resources as energy and time.

This objective is at least partially achieved by the subject-matter of the independent claims. Embodiments are provided by the dependent claims, the following description and the accompanying figures.

The described embodiments similarly pertain to the method for parking a vehicle in a parking spot, the automated parking assist system for parking a vehicle in a parking spot, the controller, the computer program element and the computer-readable medium. Synergetic effects may arise from different combinations of the embodiments although they might not be described in detail.

Further on, it shall be noted that all embodiments of the present disclosure concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

In an example scenario where an automated parking assist system has information about free parking spots, a driver of a vehicle and user of an automated parking assist system comprising a human man interface (HMI) may indicate to the HMI that an automated parking is desired. The driver may optionally have the possibility to select a desired parking spot. The HMI thereupon instructs the driver to hand over the vehicle control to the system.

According to a first aspect, in, e.g., such an example scenario, an automated parking assist system for parking a vehicle in a parking spot is provided. The automated parking assist system comprises a controller, which is configured to handover drive control from a user to the automated parking assist system, and to start an automated parking procedure. The controller is configured to initiate the handover as the vehicle approaches the parking spot, i.e., at speed, and to finish the handover before the vehicle reaches the parking spot.

The early handover enables the controller to perform several actions, e.g., to start calculating the trajectory before reaching the parking spot and/or to find a suitable position from which parking maneuvers may be started, so that the trajectory is improved. The improved trajectory again allows for a reduced number of parking maneuvers as, for example, moving the vehicle forward or backwards in order to drive the vehicle into the parking spot. The term "reaching the parking spot" means that when driving along the road towards the parking spot, the handover is finished before the front side of the vehicle crosses a virtual line perpendicular to the road running, at the beginning of the free space of the parking spot. Therefore, in this disclosure the expression "reaching the parking spot" has to be distinguished from the expression "final parking position", where the vehicle is finally stopped for parking.

According to an embodiment, the controller may be configured to first guide the vehicle to a first stop position from which parking maneuvers being part of the automated parking procedure are started. The number of parking maneuvers may be one or two, or it may be zero, in a case where no further maneuver is necessary.

In other words, the controller may first calculate an ideal first stop position for the parking maneuvers and may guide the vehicle to this first stop position. The controller may acquire or calculate the trajectory and may maneuver from the current position of the vehicle to the final position or it may guide the vehicle to a first stop position, and may acquire the trajectory regarding maneuvers from this position, depending on the local conditions. A predefined first stop position may, for example, be at a pre-defined lateral and longitudinal distance from the parking spot and a pre-defined angle between the vehicle and parking spot. The first stop position may further depend on the type of parking spot and whether the vehicle shall be parked in a forward or in a backwards direction. Therefore, the handover may in an example embodiment be finished noticeably before reaching the parking spot, so that the controller has enough time and there is enough space to acquire a favorable trajectory along which the controller can drive the vehicle to a suitable first stop position. In one example, the first stop position may be the final parking position, as explained below.

In an example embodiment, the controller may be provided with information about free parking spots, the type of the parking spots, and further information of the parking area, as, e.g., streets or obstacles. The early knowledge about the parking environment allows the controller to select a free parking spot, to perform the handover and to guide the vehicle to the first stop position.

In an example, the driver may configure, whether the vehicle shall be parked in forwards or in backwards direction. Since the controller has a knowledge of the local conditions, the first stop position can be calculated in advance such that it can perform an efficient forwards or backwards parking procedure.

According to an embodiment, the automated parking procedure may comprise a parallel parking procedure or a bay parking procedure. In a parallel parking procedure, the vehicle will be parked parallel to the street running, whereas in a bay parking procedure the vehicle will be parked perpendicular or diagonally with respect to the street running.

According to an embodiment, in a parallel parking procedure, the controller may be configured to stop the vehicle for a pre-defined time interval at the first stop position, to flash a turn indicator in order to indicate that the vehicle is in the process of parking, and to acquire the parking trajectory. By stopping and flashing a turn indicator, other vehicles are warned that the vehicle is about to perform parking maneuvers and that they should keep distance to the vehicle. Further, they are informed, that the parking spot is now claimed by the vehicle. The pre-defined time interval is in an example embodiment configured such that the controller has enough time for calculating the trajectory, and such that the drivers of other vehicles get aware about the situation. Alternatively, the controller may be configured to at least start calculating the trajectory before reaching the parking spot, i.e., before reaching the virtual line perpendicular to the road running at the beginning of the parking spot, instead of calculating the trajectory at the first stop position.

According to an embodiment, the controller may be configured to perform, in the parallel parking procedure, after the time interval has expired, a parallel parking maneuver which comprises driving forward to an intermediate position, which is, e.g., a second stop position, selecting a reverse gear and guiding the vehicle to the final position according to the acquired parking trajectory.

In an alternative parallel parking procedure, the controller may be configured to both, flash a turn indicator in order to indicate that the vehicle is in the process of parking, and to acquire a parking trajectory while approaching the parking spot, i.e., before reaching the parking spot, and to drive to a first stop position, which may correspond to the intermediate position described above, to select a reverse gear and to guide the vehicle to the final position according to the acquired parking trajectory. The early handover allows acquiring the trajectory before reaching the parking spot and a suitable first stop position. In contrast to the parallel parking procedure, only one stop is necessary. This stop takes place at a position, from which only one maneuver needs to be performed to arrive at the final parking position.

According to an embodiment, in a first bay parking procedure, the controller may be configured to decrease the speed of the vehicle, to indicate that the vehicle is in the process of parking by flashing a turn indicator, to acquire the parking trajectory from the current position to a final position and to guide the vehicle to the first stop position, which is the final position of the vehicle, according to the acquired parking trajectory. That is, after handover, the controller decelerates the vehicle to a proper parking run-up speed, acquires the trajectory to the final position as the vehicle is moving, and drives the vehicle to the final position without stopping.

According to a further embodiment, in a second bay parking procedure, the first stop position may be a position of the vehicle after reaching the parking spot. The controller may be configured to decrease the speed of the vehicle, to acquire the trajectory from the first stop position to the final position before reaching the first stop position, to perform a single parking maneuver from the first stop position to the final position, wherein the parking maneuver comprises stopping the vehicle at the first stop position, selecting a reverse gear, and guiding the vehicle backwards to the final parking position.

Similarly to the first bay parking procedure, after handover, the controller may decelerate the vehicle to a proper parking run-up speed and may acquire the trajectory during driving to the first stop position. The calculation of the trajectory may be performed as soon as the distance to the parking spot can be measured.

According to a further embodiment, in a third bay parking procedure, the first stop position may be a position of the vehicle after reaching the parking spot. The controller may be configured to decrease the speed of the vehicle, acquire the trajectory from the first stop position to the final position before reaching the first stop position, perform a first and a second parking maneuver, wherein the controller is configured to stop the vehicle at the first stop position, select a reverse gear and starts the first parking maneuver. The first parking maneuver may comprise guiding the vehicle from the first stop position to an intermediate position, where it is stopped, a forward gear is selected, and from which the second parking maneuver is started. The second parking maneuver may comprise guiding the vehicle forwards from the intermediate position to the final parking position.

According to an embodiment, the automated parking assist system may further comprise a human machine interface, HMI, for selecting the parking spot before the handover of the drive control. The HMI may comprise a microphone, a touch display, switches and/or soft or hardware buttons for a user input and a display, loudspeaker, LEDs for communicating information to the user.

According to an aspect, a vehicle is provided comprising an automated parking assist system as described above.

According to a further aspect, a controller in an automated parking assist system for parking a vehicle in a parking spot as described above is provided. The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

According to a further aspect, a method for parking a vehicle in a parking spot is provided. The method comprises handing over drive control from a user to an automated parking assist system and starting an automated parking procedure; wherein the handover is initiated as the vehicle approaches the parking spot and wherein the handover is finished before the vehicle reaches the parking spot. This allows the automated parking assist system to acquire the trajectory at an early stage in the parking procedure. E.g., the trajectory may be acquired as soon as the distance to the parking spot can be measured, and while the vehicle approaches the parking spot at decreased speed.

In an example, the method may further comprise scanning a parking lot for parking spots ahead, selecting a parking spot before handing over drive control, and calculating a parking trajectory.

In a further example, the method may further comprise, after the step of starting an automated parking procedure: switching on turning indicators and driving to a first stop position; if the first stop position is the final position, stopping the car and switching off the turning indicators, otherwise selecting a forward or a reverse gear and driving to a next stop position according to the parking trajectory; if the next stop position is not the final position, repeating the step of selecting a forward or a reverse gear and driving to a further next stop position according to the parking trajectory until the vehicle has reached the final parking position.

In a further example, driving according to the parking trajectory may comprise: driving to a parallel parking spot, which is a parking spot aligned parallel to the road running, or driving to a bay parking spot, which is a parking spot non-parallel to the road running.

According to a further aspect, a program element is provided, which when being executed by the controller in the automated parking assist system for parking a vehicle in a parking spot, instructs the automated parking assist system to perform the steps of the method described above. The program element may be part of a computer program, but it can also be an entire program by itself. For example, the computer program element may be used to update an already existing computer program to get to the present disclosure.

According to a further aspect, a computer readable medium is provided, on which such a program element is stored. The computer readable medium may be seen as a storage medium, such as for example, a USB stick, a CD, a DVD, a data storage device, a hard disk, or any other medium on which a program element as described above can be stored.

These and other features, aspects and advantages of the present disclosure will become better understood with reference to the accompanying figure and the following description.

BRIEF DESCRIPTION OF EMBODIMENTS

Figure 2:
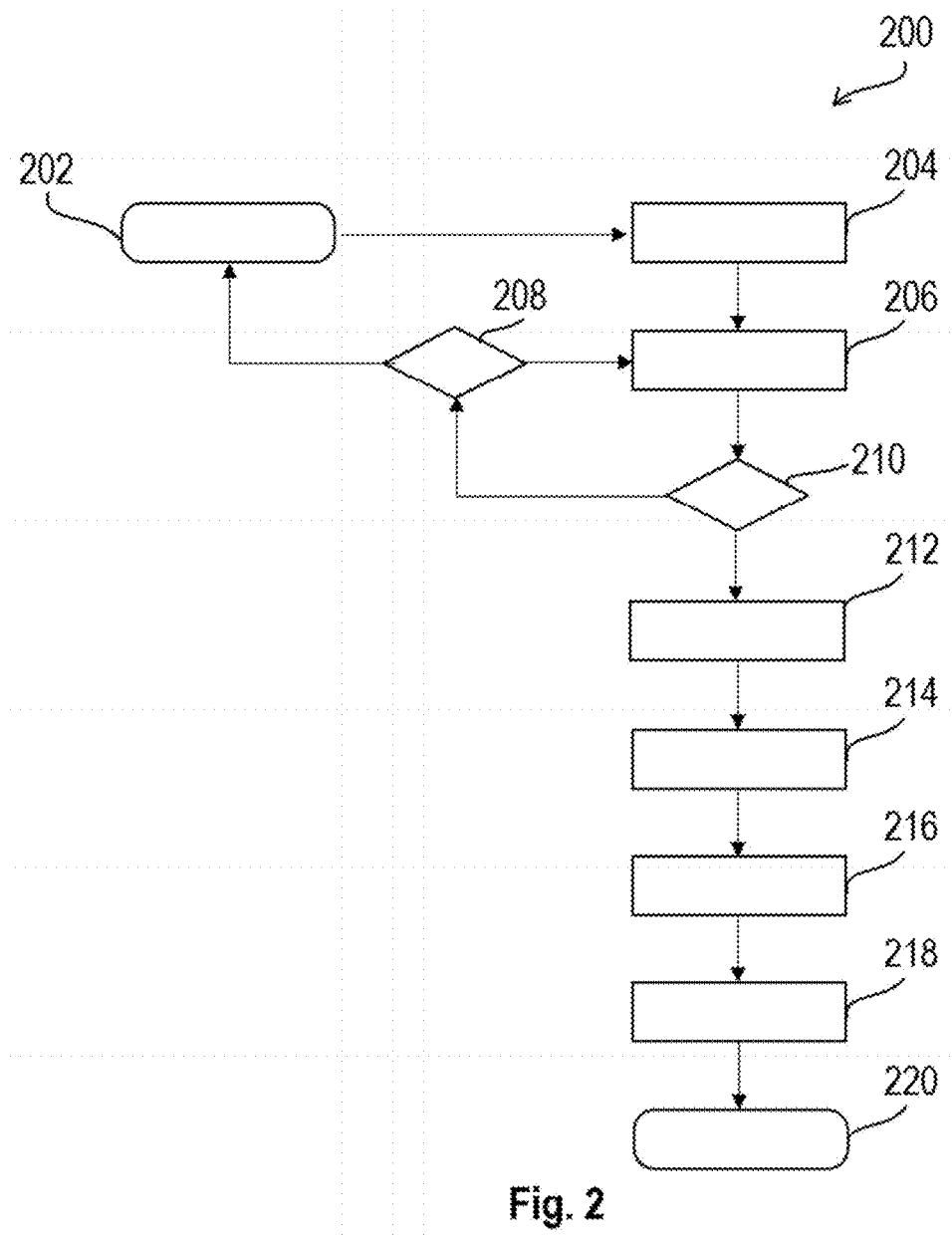
Figure 3:
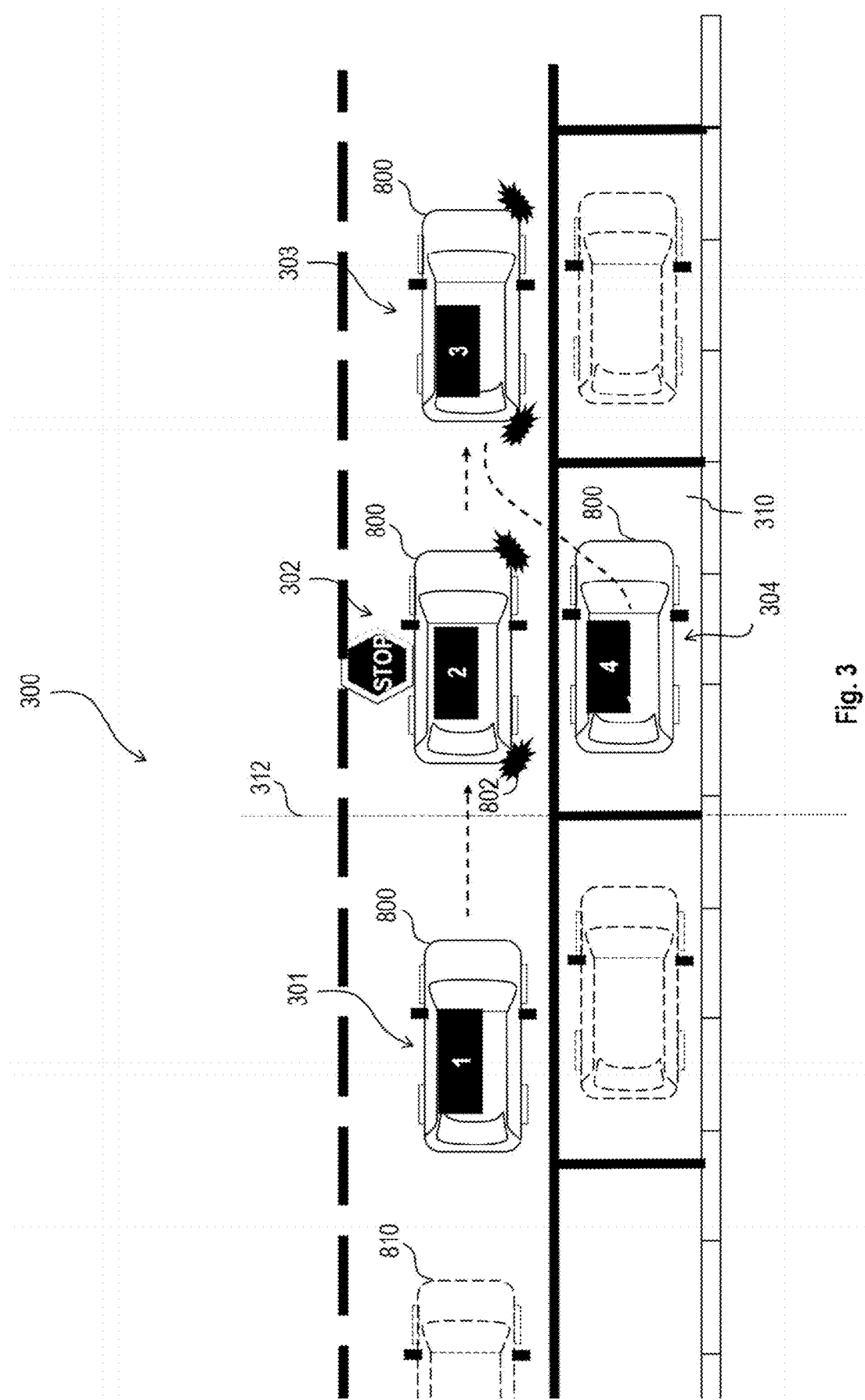
Figure 4:
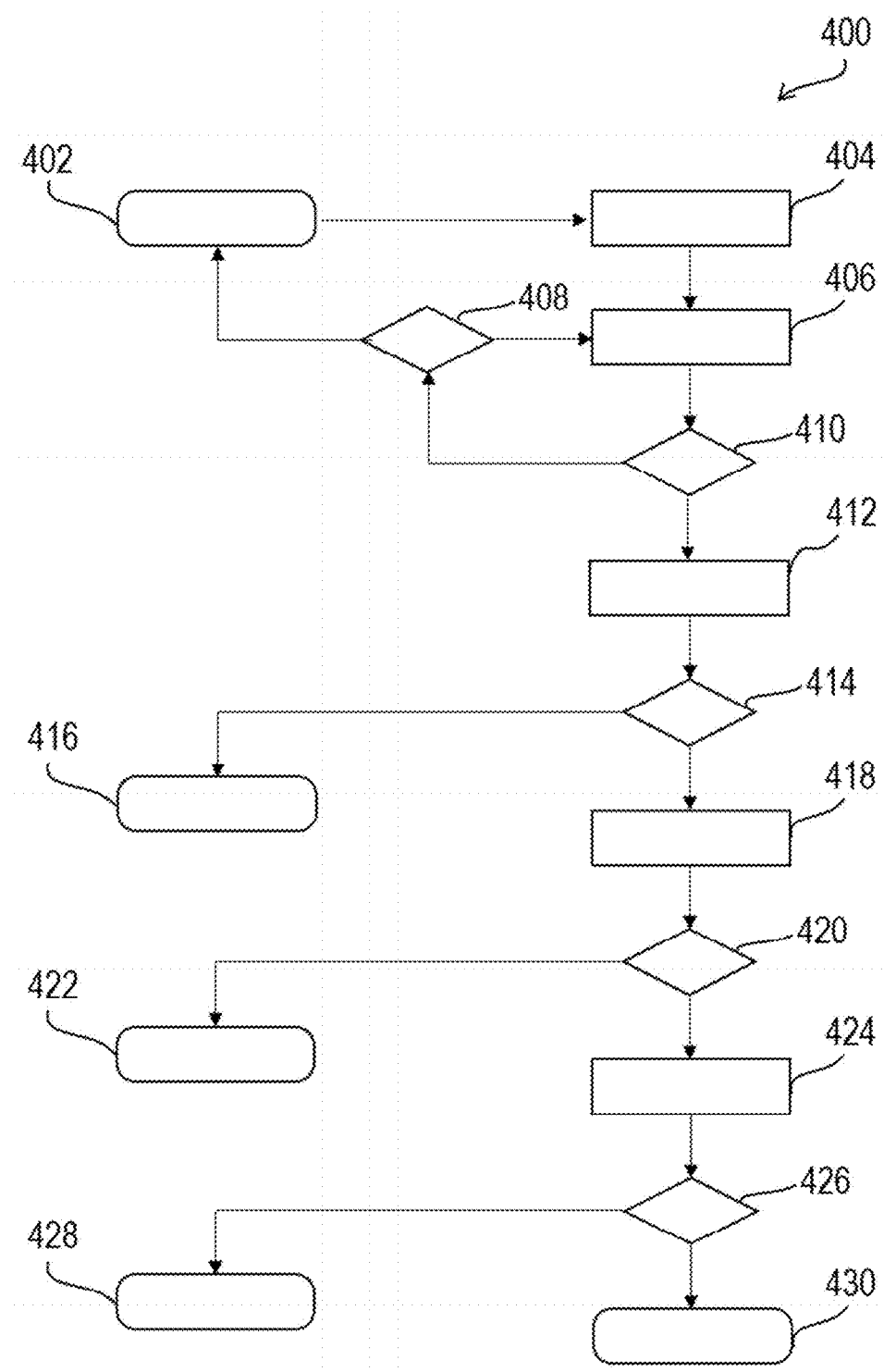
Figure 5:
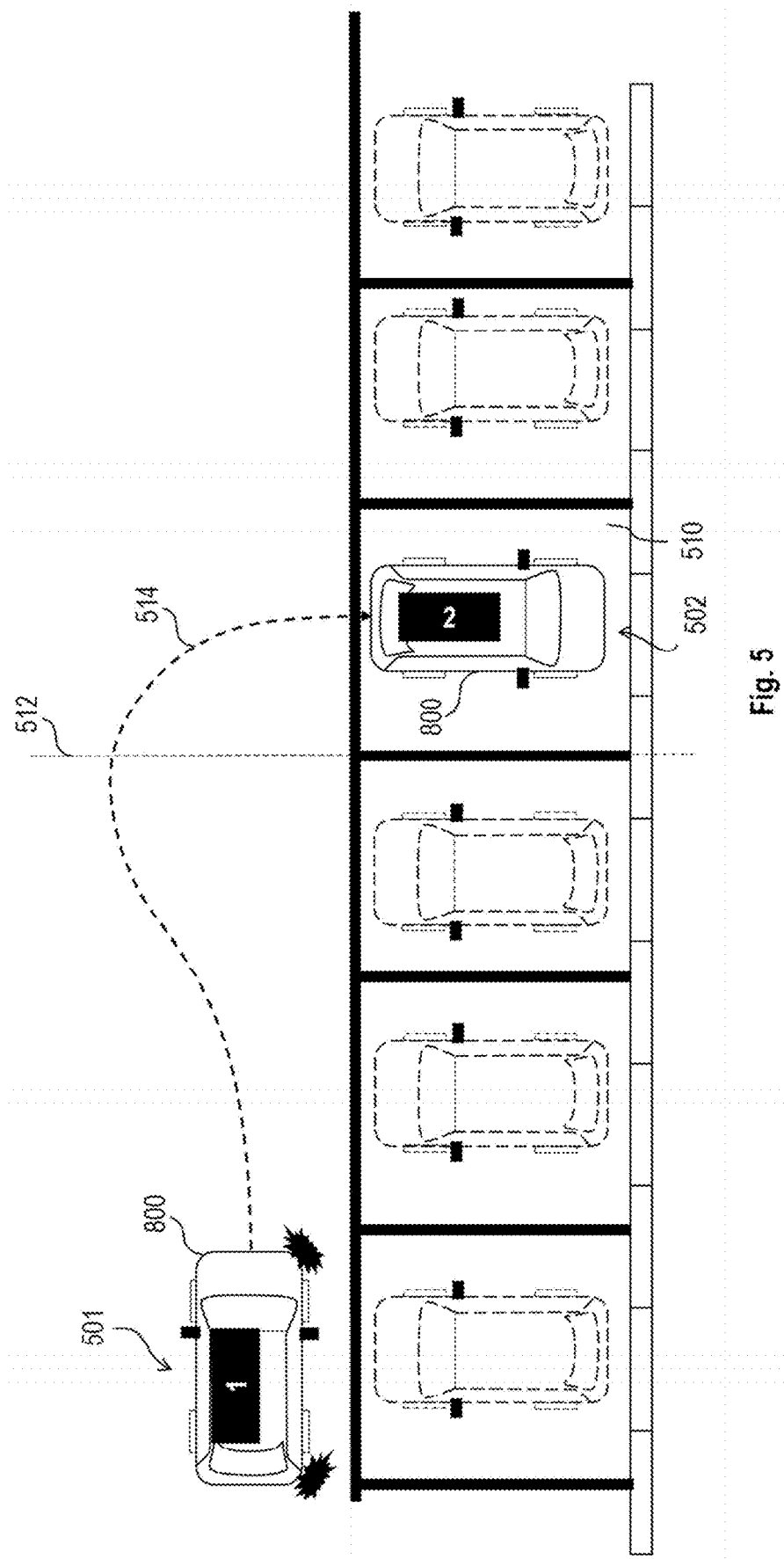
Figure 6:
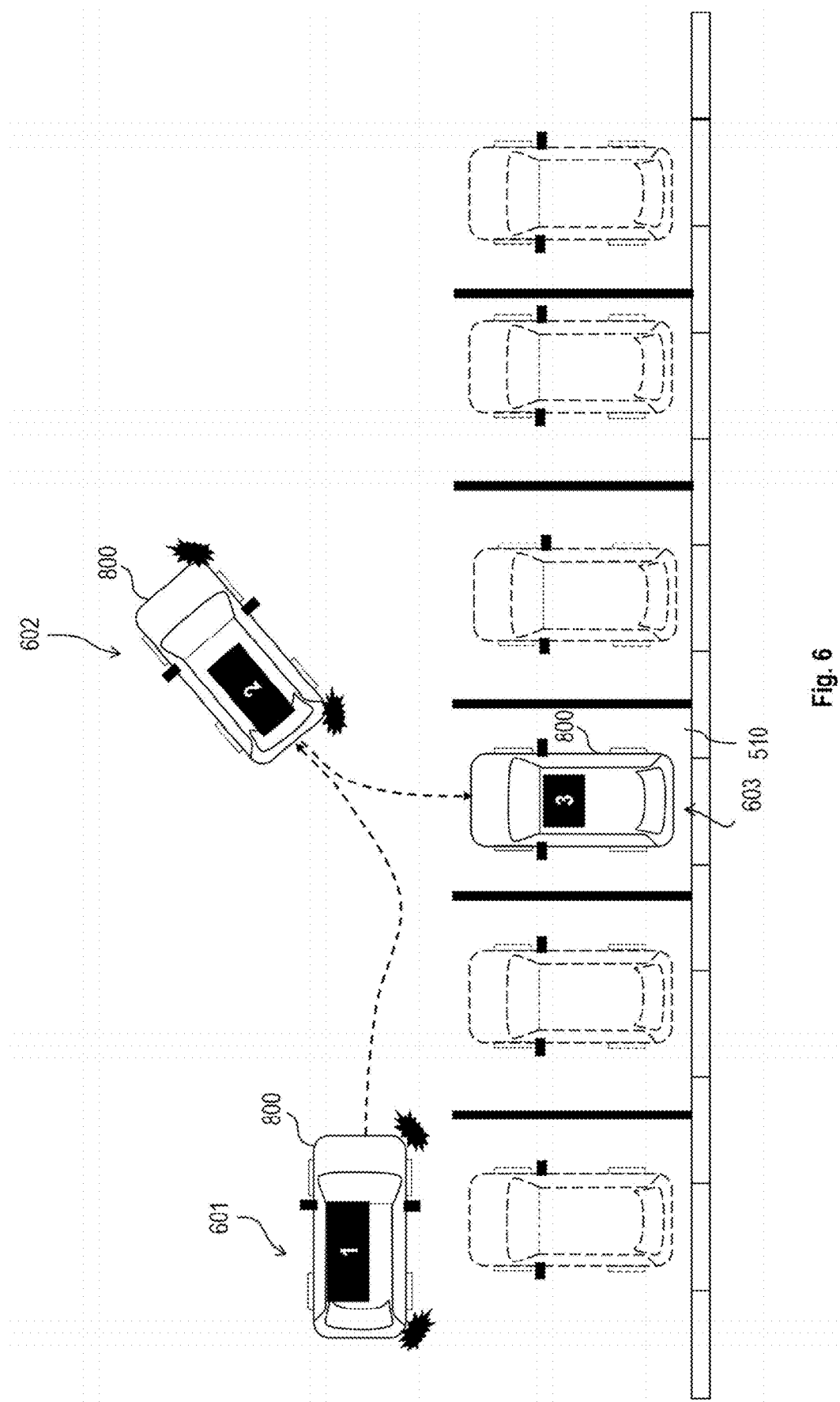
Figure 7:
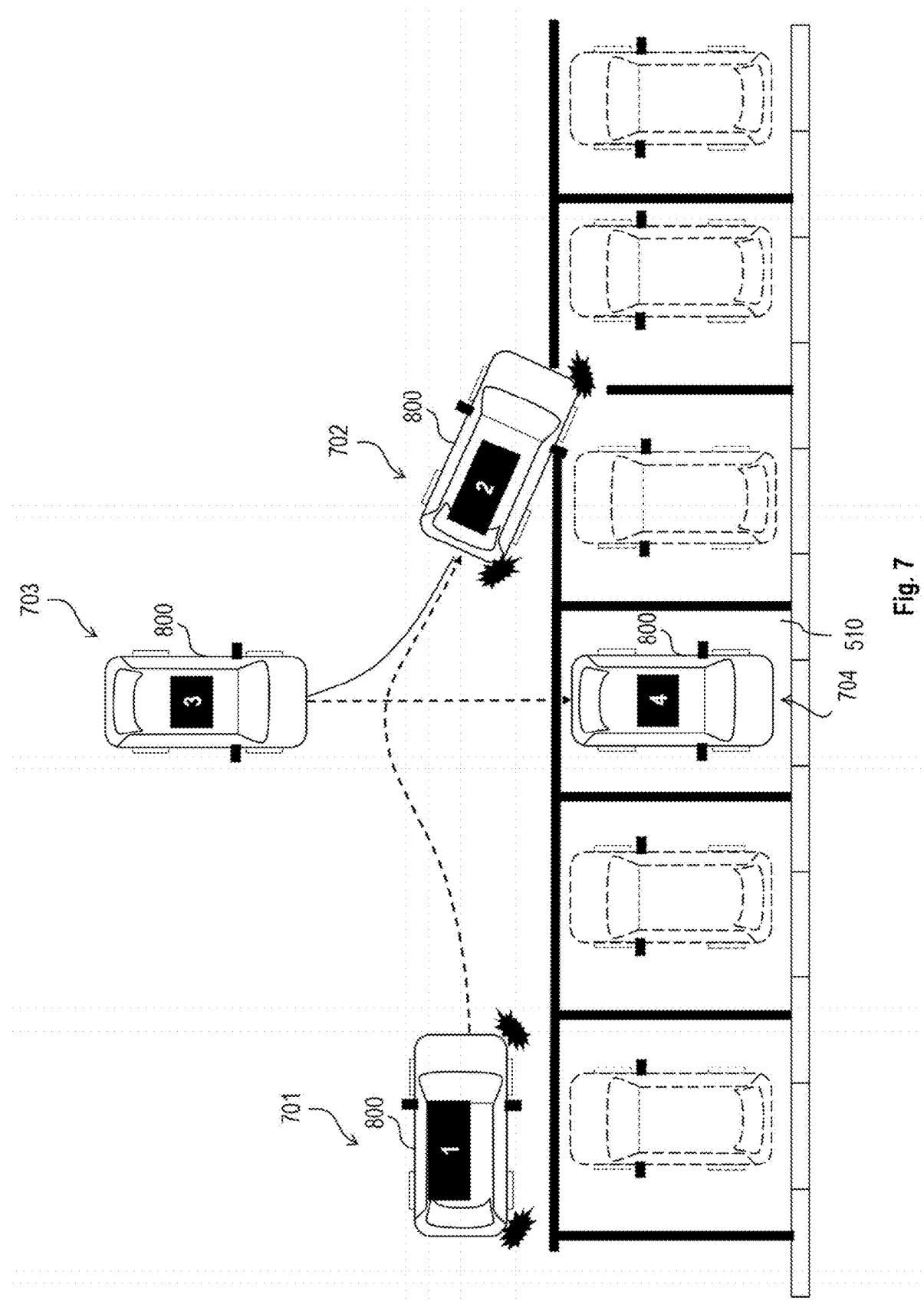
Figure 8:
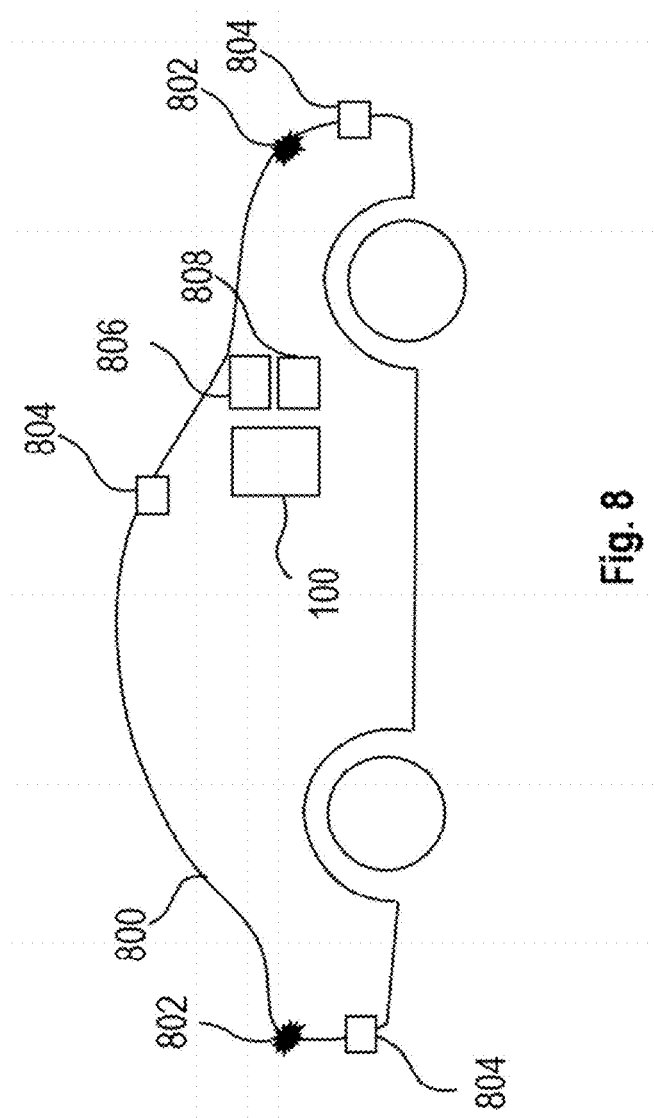

FIG. 1 shows a block diagram of an automated parking assist system according to an embodiment, FIG. 2 shows a flow diagram of a parallel parking procedure according to an embodiment, FIG. 3 shows an illustration of a parallel parking procedure according to an embodiment, FIG. 4 shows a flow diagram of a bay parking procedure according to an embodiment, FIG. 5 shows an illustration of a first example of a bay parking procedure, FIG. 6 shows an illustration of a second example of a bay parking procedure, FIG. 7 shows an illustration of a third example of a bay parking procedure, FIG. 8 shows a diagram of a vehicle according to an embodiment.

DESCRIPTION OF EMBODIMENTS

FIG. 1 shows a block diagram of an automated parking assist system 100 for a vehicle comprising a controller 102 and a human-man-interface (HMI) 104. The HMI 104 may be controlled by controller 102 and comprises a communication interface 114 for connecting to a database, to a navigation system, to a camera or other sensors as, e.g., sensors of a parking system providing information regarding free and occupied parking spots. Connections may be realized via a wireless data transmission device or via cable. The HMI 104 may further comprise a user interface 112 with user input means 106 and user output means 108 as a display, a touch screen, an acoustic interface or other control elements. The HMI 104 is responsible for detecting free parking spots and providing the results, e.g., by visual or acoustic means, to a driver of the vehicle. The HMI 104 may be configured to provide the driver a choice, whether the HMI 104 shall automatically select a parking spot out of the detected free parking spots or to manually select a preferred parking spot and/or to park forwards or backwards. The HMI 104 further detects the type of parking spot, i.e., a parallel parking spot or a bay parking spot. Once the parking spot is selected, the driver may handover the control of the vehicle to the automated parking assist system 100 as explained in the following figures. The controller 102 comprises an interface 110 to devices controlling the motor, the gear, and the steering of the vehicle.

FIG. 2 shows a flow diagram of a method 200 for an optimized automated run-up for a parallel parking procedure. Starting with 202, the parking assist system 100 automatically scans for free parking spots ahead. The scan may be supported, for example, by external information, and/or by on-vehicle sensors. The found spots are presented to the driver. In 204, the HMI 104 waits for an input of the driver, who selects a desired parking spot in the HMI 104. Alternatively, the driver may allow the HMI 104 to select a parking spot. In 206, the parking assist system 100 acknowledges the selection of the parking spot by instructing the driver to hand over the vehicle control to the parking assist system 100. The handover is performed at speed. I.e., the handover is performed at an early stage before reaching the parking spot and the vehicle does not have to be stopped for the handover. In 210, the parking assist system 100 checks, whether the handover has been performed. If not, for example, because the driver did not give a corresponding input to the HMI 104, in 208 it is checked, whether the spot has been passed. If yes, the procedure goes to 202, where system 100 scans further for spots and presents the found spots to the driver. If no, steps 206 and 210 are repeated. If the result of the check 210 for handover is positive, the automated parking assist system 100 is in 212 in control of the vehicle, so that the driver is only supervising the actions of the system 100. The system 100 then begins to decelerate the vehicle towards standstill. In 214, the system 100 stops the vehicle at a first stop position right next to the selected parking spot for a pre-determined period of time and activates the turn indicators. The period of time is large enough for claiming the parking spot and to acquire the trajectory. Therefore, the combination of two automated sequential actions constitute the claiming of the spot: Firstly, the vehicle is stopped next to the parking spot. Secondly, the turn indicators are started to flash. These two actions cause the driver of the vehicle behind to stop its vehicle and to stay at a secure distance, instead of spoiling the parking opportunity. The trajectory may also be acquired before reaching the first stop position. The trajectory may comprise an intermediate stop position. Finally, in 216, the automated parking assist system 100 drives the vehicle forward to the intermediate stop position, stops and changes the gear to a reverse gear, and maneuvers in 218 the vehicle backwards into the parking slot according to the acquired trajectory. There, the controller stops the vehicle at the final park position, so that the parallel parking procedure is finished in 220.

FIG. 3 illustrates the method 200 described above. Vehicle 800 at current position 301 drives along the road and is about to approach parking spot 310. In this phase, the HMI 104 has information about free parking spots along the road, which are arranged parallel to the street. The HMI 104 presents the next free spot 310 to the driver who selects the spot, e.g., by touching a display of the HMI 104 or by a speech command and hands over the control of the vehicle 800 to the automated parking assist system 100. After the handover, the controller 102 of the system 100 decreases the speed of the vehicle and stops at first stop position 302 next to the spot 310. The handover is therefore finished distinctly before reaching the parking spot 310, i.e., before reaching line 312 in FIG. 3, so that there is enough time to decrease the speed and drive the vehicle 800 to the first stop position 302. At the first stop position 302, the turning indicators 802 are switched on. Further, the trajectory for the parallel parking maneuvers is acquired. The stopping for a period of time and switching on the turning indicators signals to the vehicle 810 behind vehicle 800 that the spot is claimed by vehicle 800 and that a parking procedure will be started. The parking procedure comprises two maneuvers. In the first maneuver, the controller 102 drives the vehicle 800 forward to the intermediate position 303, where it stops the vehicle 800 and selects a reverse gear. In the second parking maneuver, the controller guides the vehicle 800 backwards to its final parking position 304.

Thus, due to the early handover on the fly, the controller is enabled to drive the vehicle 800 to a suitable first stop position, e.g., position 302. Further, at the first stop position 302, measures are taken to prevent the following vehicle from intruding into the area needed for the maneuvers or even occupying the parking spot claimed by vehicle 800.

FIG. 4 shows a flow diagram of a second method 400. The flow diagram describes an optimized automated run-up for a bay parking procedure. Starting with 402, the parking assist system 100 automatically scans for spots ahead. The found spots are presented to the driver. In 404, the HMI 104 waits for an input of the driver, who selects a desired parking spot in the HMI 104. In 406, the parking assist system 100 acknowledges the selection of the parking spot by instructing the driver to hand over the vehicle control to the parking assist system 100. The handover is performed at speed, so that it is performed at an early stage before reaching the parking spot. In 410, the parking assist system 100 checks, whether the handover has been performed. If not, for example, because the driver did not give a corresponding input to the HMI 104, in 408 it is checked, whether the spot has been passed. If not, the procedure goes back to 402. If yes, in 412, the automated parking assist system 100 is in control of the vehicle, so that the driver is only supervising the actions of the system 100. The controller starts to decelerate the vehicle to a proper parking run-up speed and activates the turn indicators. As soon as the distance to the parking spot can be measured, the trajectory is acquired as the vehicle is moving. The acquired trajectory may lead to one of several positions. E.g., in a direct forward parking procedure, the trajectory may comprise a single step, so that the "first stop position" coincides with the final position. If this is in 414 the case, the parking procedure is finished 416. Otherwise, in 418 the trajectory leads directly to a first stop position, whereby it passes the parking spot without stopping before it reaches the first stop position. At the first stop position, the vehicle is stopped for the first time, and a reverse gear is selected. Afterwards, a first maneuver is conducted from the first stop position to a next position. If, in 420, the vehicle shall be parked backwards, the next position of the maneuver is the final position and the procedure is finished 422. Otherwise, in case of a forward parking procedure according to check 420, in 424, the controller drives vehicle to the next position, which is an intermediate position, at which a forward gear is selected and a second maneuver is started. If, in 426, the final position cannot be reached, the procedure has failed 428. Otherwise, the final position is reached and the procedure is finished 430 successfully.

Therefore, by calculating the trajectory on the fly during approaching the parking spot, the vehicle can be driven directly to a first stop position with only zero (direct forward parking), one (rearward parking) or two (indirect forward parking) maneuvers. The number of stops including the first stop position and the final position is only one (direct forward parking), two (backwards parking) or three (indirect forward parking).

FIGS. 5 to 7 illustrate the method 400. FIG. 5 shows a first scenario, where a vehicle is parked forwards into the parking spot 510. Vehicle 800 drives along the road and is about to approach parking spot 510. In this phase, the HMI 104 has information about free parking spots along the road, which are arranged perpendicular to the street. The HMI 104 presents the next free spot 510 to the driver who selects the spot, e.g., by touching a display of the HMI 104 or by a speech command and hands over the control of the vehicle 800 to the automated parking assist system 100. The controller 102 of the system 100 switches on the turning indicators at position 501 and acquires the trajectory and contemporarily decreases the speed of the vehicle. The handover is therefore finished distinctly before reaching the parking spot 510, i.e. before reaching line 512 in FIG. 5, so that the controller can acquire the trajectory 514 and drive the vehicle 800 along the acquired trajectory 514. The controller finally drives the vehicle to its final parking position 502 without stopping in-between.

FIG. 6 shows a scenario where the driver or the system 100 has chosen to park backwards into the parking spot 510. In this case, after handing over the control of the vehicle 800 to the system 100 during approaching the parking spot 510, the controller switches on the turning indicators at position 601 and calculates a first stop position 602 to which it guides the vehicle 800 without stopping, and the trajectory from the first stop position to the final parking position 603 in the spot 510. At the first stop position 602 a reverse gear is selected, and the controller guides the vehicle to the final parking position 603 in a single maneuver.

FIG. 7 shows a scenario where the driver or the system 100 has chosen to park forwards into the parking spot 510. In this example, the space may be too narrow to follow a trajectory as shown in FIG. 5. Therefore, an intermediate step might be necessary. Similar to the previous example in FIG. 6, the handover of the vehicle control and the calculation of the trajectory are performed in an early phase, when the vehicle 800 is approaching the parking spot 510. The controller switches on the turning indicators at position 701 and calculates a suitable first stop position 702 to which it drives the vehicle 800 without stopping. A first maneuver is initiated from the first stop position 702, where the controller selects a reverse gear and guides the vehicle 800 to the intermediate position 703. At this position, the controller changes the gear, switches of the turn indicator and drives the vehicle 800 to the final parking position according to the acquired trajectory.

Thus, also in this relatively complex scenario, there is only one stop between first stop position 702 and end position 704.

This is achieved by handing over the control of the vehicle 800 and calculating the trajectory in a very early stage, so that the first stop position, which is a position, where the vehicle is stopped the first time, is a position, which is followed by only very few further stop positions. In one scenario (FIG. 5), besides of the stop at the final position, no further stop is performed, so that when reaching the "first stop position" the final parking position is yet reached, and no maneuver has to be performed.

FIG. 8 shows a block diagram of a vehicle 800 with an automated parking assist system 100 as presented in FIG. 1. The vehicle comprises sensors 804 as, for example, a camera, radar, sonar, or sensors for measuring speed, direction and distances, etc. Furthermore, the vehicle 800 comprises a communication unit 806 for receiving external sensor data. E.g., the parking lot is equipped with sensors for detecting whether a parking spot is occupied or not, and transmits this information to the vehicle 800. Further, a map of the parking lot may be obtained either by transmission from an external source to the communication unit 806, or by a navigation system device 808. Other combinations are possible; e.g., external information may be received by the communication unit 806 and stored in a memory of the navigation system 808, which is accessed by the parking assist system 100. Moreover, the vehicle 800 comprises turn indicators 802, which may be activated by the parking, assist system 100. Furthermore, the parking assist system 100 is connected to devices for controlling the motor, the steering, and the gears.

Other variations to the disclosed embodiments can be understood and effected by those skilled in the art in practicing the claimed disclosure, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

100 Automated parking assist system
102 Controller
104 Human-man-interface (HMI)
106 User input means
108 User output means
110 Interface
112 User interface
114 Communication interface
200 Example of a first method
202 . . . 220 Steps of the method 200
301 Initial position in example of FIG. 3
302 First stop position in example of FIG. 3
303 Intermediate position in example of FIG. 3
304 Final parking position in example of FIG. 3
310 Free parking spot in example of FIG. 3
312 Line indicating the reaching of parking spot 310
400 Example of a second method
402 . . . 430 Steps of the second method
501 Initial position in example of FIG. 5
502 Final parking position in example of FIG. 5
510 parking spot in example of FIGS. 5 to 7
512 Line indicating the reaching of parking spot 510
514 Trajectory
601 Initial position in example of FIG. 6
602 First stop position in example of FIG. 6
603 Final parking position in example of FIG. 6
701 Position in example of FIG. 7
702 First stop position in example of FIG. 7
703 Intermediate position in example of FIG. 7
704 Final position in example of FIG. 7
800 Vehicle
802 Turning indicators
804 Sensors
806 Communication unit
808 Navigation system device
810 Vehicle behind vehicle 800

The invention claimed is:

1. A system, comprising:
a controller configured to execute an automated parking process while a vehicle in motion is being driven by a human driver at a current speed, wherein the automated parking process comprises:
handing over drive control of the vehicle at the current speed from the human driver to the controller;
while the vehicle is still in motion, determining a parking procedure to park the vehicle in a parking spot selected for the vehicle, wherein the parking procedure comprises a minimum quantity of stops between a current location of the vehicle and the parking spot determined based on a type of the parking spot and a parking direction in which the vehicle will park in the parking spot, wherein, in response to determining that the type of parking spot is a parallel type:
the determining is further based upon a defined safety criteria, and the parking procedure comprises:
two stops in a parallel parking procedure, wherein the parallel parking procedure comprises:
continuing the motion of the vehicle on a first trajectory to a first stop of the two stops in the parallel parking procedure,
stopping the vehicle at the a first stop of the two stops in the parallel parking procedure,
turning on an indicator signal of the vehicle to indicate the vehicle is going to park in the parking spot,
driving the vehicle on a second trajectory to a second stop of the two stops in the parallel parking procedure;
stopping the vehicle at the second stop of the two stops in the parallel parking procedure,
selecting a reverse gear of the vehicle, and
driving the vehicle on a third trajectory to a final parking position in the parking spot; and
performing the parking procedure.

2. The system of claim 1, wherein the type of parking spot is the parallel type or a bay type.

3. The system of claim 2, wherein the parking direction is a forward direction or a backwards direction.

4. The system of claim 1, wherein, in response to determining that the type of parking spot is a bay type, and the direction is a forward direction, the parking procedure comprises:
no stops in a bay parking procedure, wherein the bay parking procedure comprises:
continuing the motion of the vehicle on a trajectory to a final parking position in the parking spot.

5. The system of claim 1, wherein, in response to determining that the type of parking spot is a bay type, and the direction is a backwards direction, the parking procedure comprises:
one stop in a bay parking procedure, wherein the bay parking procedure comprises:
continuing the motion of the vehicle on a fourth trajectory to the one stop, stopping the vehicle at the one stop,
selecting a reverse gear of the vehicle, and
driving the vehicle on a fifth trajectory to the final parking position in the parking spot.

6. The system of claim 1, wherein, in response to determining that the type of parking spot is a bay type, and the direction is a forward direction:
the determining the parking procedure that comprises the minimum quantity of stops is further based on a size of the parking spot, and the parking procedure comprises:
two stops in a bay parking procedure, wherein the bay parking procedure comprises:
continuing the motion of the vehicle on a fourth trajectory to a first stop of the two stops in the bay parking procedure,
stopping the vehicle at the first stop of the two stops in the bay parking procedure,
selecting a reverse gear of the vehicle,
driving the vehicle on a fifth trajectory to a second stop of the two stops in the bay parking procedure;
stopping the vehicle at the second stop of the two stops in the bay parking procedure,
selecting a forward gear of the vehicle, and
driving the vehicle on a sixth trajectory to the final parking position in the parking spot.

7. The system of claim 1, further comprising a human machine interface, HMI, for selecting the parking spot previous to the handing over of the drive control.

8. A method, comprising:
executing, by controller comprising a processor, an automated parking process while a vehicle in motion is being driven by a human driver at a current speed, wherein the automated parking process comprises:
handing over drive control of the vehicle at the current speed from the human driver to the controller;
while the vehicle is still in motion, determining, by the controller, a parking procedure to park the vehicle in a parking spot selected for the vehicle, wherein the parking procedure comprises a minimum quantity of stops between a current location of the vehicle and the parking spot determined based on a type of the parking spot and a parking direction in which the vehicle will park in the parking spot, wherein, in response to determining that the type of parking spot is a parallel parking spot:
the determining is further based upon a defined safety criteria, and the parking procedure comprises:
two stops in a parallel parking procedure, wherein the parallel parking procedure comprises:
continuing the motion of the vehicle on a first trajectory to a first stop of the two stops in the parallel parking procedure,
stopping the vehicle at the a first stop of the two stops in the parallel parking procedure,
turning on an indicator signal of the vehicle to indicate the vehicle is going to park in the parking spot,
driving the vehicle on a second trajectory to a second stop of the two stops in the parallel parking procedure;
stopping the vehicle at the second stop of the two stops in the parallel parking procedure,
selecting a reverse gear of the vehicle, and
driving the vehicle on a third trajectory to a final parking position in the parking spot; and
performing the parking procedure.

9. The method of claim 8, wherein the type of parking spot is the parallel type or a bay type.

10. The method of claim 8, wherein the parking direction is a forward direction or a backwards direction.

11. The method of claim 8, wherein, in response to determining that the type of parking spot is a bay type, and the direction is a backwards direction, the parking procedure comprises
no stops in a bay parking procedure, wherein the bay parking procedure comprises:
continuing the motion of the vehicle on a trajectory to a final parking position in the parking spot.

12. The method of claim 8, wherein, in response to determining that the type of parking spot is a bay type, and the direction is a backwards direction, the parking procedure comprises:
one stop in a bay parking procedure, wherein the bay parking procedure comprises:
continuing the motion of the vehicle on a fourth trajectory to the one stop,
stopping the vehicle at the one stop,
selecting a reverse gear of the vehicle, and
driving the vehicle on a fifth trajectory to the final parking position in the parking spot.

13. The method of claim 8, wherein, in response to determining that the type of parking spot is a bay type, and the direction is a forward direction:
the determining the parking procedure that comprises the minimum quantity of stops is further based on a size of the parking spot, and the parking procedure comprises:
two stops in a bay parking procedure, wherein the bay parking procedure comprises:
continuing the motion of the vehicle on a fourth trajectory to a first stop of the two stops in the bay parking procedure,
stopping the vehicle at the first stop of the two stops in the bay parking procedure,
selecting a reverse gear of the vehicle,
driving the vehicle on a fifth trajectory to a second stop of the two stops in the bay parking procedure;
stopping the vehicle at the second stop of the two stops in the bay parking procedure,
selecting a forward gear of the vehicle, and
driving the vehicle on a sixth trajectory to the final parking position in the parking spot.

14. The method of claim 8, wherein the determining the parking procedure comprises employing one or more sensors of the vehicle.

15. A non-transitory computer-readable medium having instructions stored thereon that, in response to execution, cause a processor of a vehicle to perform operations comprising:
executing an automated parking process while the vehicle in motion is being driven by a human driver at a current speed, wherein the automated parking process comprises:
handing over drive control of the vehicle at the current speed from the human driver to the controller;
while the vehicle is still in motion, determining, by the controller, a parking procedure to park the vehicle in a parking spot selected for the vehicle, wherein the parking procedure comprises a minimum quantity of stops between a current location of the vehicle and the parking spot determined based on a type of the parking spot and a parking direction in which the vehicle will park in the parking spot, wherein, in response to determining that the type of parking spot is a bay type, and the direction is a forward direction, the determining the parking procedure that comprises the minimum quantity of stops is further based on a size of the parking spot, and the parking procedure comprises:
two stops in a first bay parking procedure, wherein the first bay parking procedure comprises:
continuing the motion of the vehicle on a first trajectory to a first stop of the two stops in the first bay parking procedure,
stopping the vehicle at the first stop of the two stops in the first bay parking procedure,
selecting a reverse gear of the vehicle,
driving the vehicle on a third trajectory to a second stop of the two stops in the first bay parking procedure;
stopping the vehicle at the second stop of the two stops in the first bay parking procedure,
selecting a forward gear of the vehicle, and
driving the vehicle on a fourth trajectory to the final parking position in the parking spot; and
performing the parking procedure.

16. The non-transitory computer-readable medium of claim 15, wherein the type of parking spot is a parallel type or the bay type.

17. The non-transitory computer-readable medium of claim 15, wherein the parking direction is a forward direction or a backwards direction.

18. The non-transitory computer-readable medium of claim 15, wherein, in response to determining that the type of parking spot is a parallel type:
the determining is further based upon a defined safety criteria, and the parking procedure comprises:
two stops in a parallel parking procedure, wherein the parallel parking procedure comprises
continuing the motion of the vehicle on a fourth trajectory to a first stop of the two stops in the parallel parking procedure,
stopping the vehicle at the a first stop of the two stops in the parallel parking procedure,
turning on an indicator signal of the vehicle to indicate the vehicle is going to park in the parking spot,
driving the vehicle on a fifth trajectory to a second stop of the two stops in the parallel parking procedure;
stopping the vehicle at the second stop of the two stops in the parallel parking procedure,
selecting a reverse gear of the vehicle, and
driving the vehicle on a sixth trajectory to a final parking position in the parking spot.

19. The non-transitory computer-readable medium of claim 15, wherein, in response to determining that the type of parking spot is the bay type, and the direction is a backwards direction, the parking procedure does not comprise the first bay parking procedure, and comprises
no stops in a second bay parking procedure, wherein the second bay parking procedure comprises:
continuing the motion of the vehicle on a trajectory to a final parking position in the parking spot.

20. The non-transitory computer-readable medium of claim 15, wherein, in response to determining that the type of parking spot is the bay type, and the direction is a backwards direction, the parking procedure does not comprise the first bay parking procedure, and comprises:
one stop in a second bay parking procedure, wherein a second bay parking procedure comprises:
continuing the motion of the vehicle on a fourth trajectory to the one stop,
stopping the vehicle at the one stop,
selecting a reverse gear of the vehicle, and
driving the vehicle on a fifth trajectory to the final parking position in the parking spot.

* * * * *